March 23, 1937.    W. B. PICKARD ET AL    2,074,425
CONNECTION FOR FLEXIBLE HOSE
Filed Sept. 19, 1934

INVENTORS
Wilfred B. Pickard
and James C. G. Maxwell
BY
Wooster Davis
ATTORNEYS.

Patented Mar. 23, 1937

2,074,425

UNITED STATES PATENT OFFICE 2,074,425

CONNECTION FOR FLEXIBLE HOSE

Wilfred B. Pickard, Watertown, and James C. G. Maxwell, Waterbury, Conn., assignors to The American Brass Company, Waterbury, Conn., a corporation of Connecticut Application September 19, 1934, Serial No. 744,646

1 Claim. (Cl. 285—72)

This invention relates to new and useful improvements in connections for flexible hose and has for an object to provide a simple and inexpensive means for making a fluid tight connection between a pipe and a spirally wound flexible metal hose.

At present there are a large number of gasoline engine operated washing machines sold and it is standard practice to have a short pipe nipple threaded into the exhaust port of the engine of such machines and to supply a length of flexible metallic tubing or hose for conducting exhaust gases from such nipple to the outside atmosphere. A great deal of trouble has been experienced in making a satisfactory connection between such pipe nipple and flexible metal hose, particularly one that was tight and would not leak or would remain tight, and the present invention provides a simple means for making a satisfactory connection between such parts.

The accompanying drawing shows a satisfactory embodiment of the invention although it is to be understood that the invention is not limited to the details disclosed but includes all such variations and modifications as fall within the spirit of the invention and the scope of the appended claim.

Figure 1:
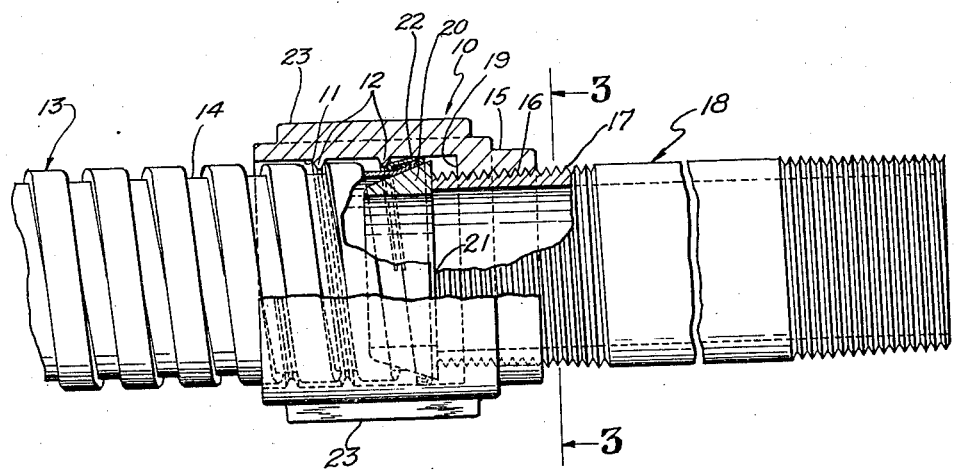
Fig. 1 is an elevational view with parts broken away showing the connection complete.

Referring in detail to the drawing, at 10 is shown a sleeve or pipe coupling provided in one end portion with a socket 11 and within said socket the sleeve is provided with screw threads 12. The socket 11 is of a diameter to receive one end portion of a spirally wound flexible metal hose or tubing 13 and the screw threads 12 of said socket correspond with the pitch of the spirals 14 of said flexible metal tubing so that the coupling can be threaded onto the tubing or the tubing threaded into the coupling with the threads 12 in the spiral grooves 14 of the tubing. In its end portion 15 the sleeve 10 is internally screw threaded as at 16 and such threads may be either straight or tapered to receive the threaded end 17 of a pipe nipple 18. The end portion 15 of the sleeve is preferably of an internal diameter less than that of the socket 11 whereby an annular shoulder 19 is provided within the sleeve and such shoulder represents the inner limit of the socket 11, but this shoulder may be omitted.

An externally tapered ring 20 is used in making the connection between the nipple 18 and the flexible metal hose 13 and the inner diameter of this ring, as clearly shown in Fig. 1, is less than the inner diameter of the portion 15 of the sleeve, while the outer diameter of said ring at its large end is greater than the diameter of the opening through the end portion 15 of the sleeve. The ring is insertable into the socket 11 but it will be apparent that the ring reaches the limit of its movement into said socket when the large end of the ring abuts the internal shoulder 19 of the sleeve. The taper of the outer wall of the ring 20 is such that the smaller end of the ring may be inserted into the end of the flexible metal hose 13 so that the ring will enter said hose for a short distance or approximately to the extent shown in Fig. 2.

Figure 2:
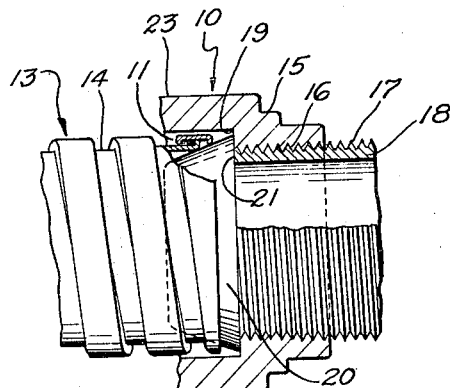
Fig. 2 is a somewhat similar view showing the positions of the parts prior to the tightening of the connection.

In making the connection the ring 20 is placed in an end of the flexible metal hose 13 and enters the hose to about the extent illustrated in Fig. 2. Thereafter the coupling is threaded onto said end of the hose so it extends into the socket 11 of the sleeve 10 approximately to the extent shown in Fig. 2 or until the larger end of the ring 20 engages the inner annular shoulder 19 of the sleeve. If desired, the party making the connection may, if the shoulder 19 is not present, look into the sleeve through the opening in the end portion 15 thereof to determine when the hose has been threaded into the sleeve the proper distance.

After the coupling or sleeve is threaded the proper distance onto the hose the threaded end 17 of the pipe nipple 18 is threaded into the internally threaded end portion 15 of the sleeve until the inner end 21 of said nipple engages the large end of the ring 20. Thereafter, the sleeve 10 and nipple 18 are threaded up tight either by turning the nipple 18 into the sleeve 10 with wrenches or by turning the sleeve 10 and flexible hose 13 onto the nipple 18. As the elements are being tightened the end 21 of the nipple 18 binds or presses against the large end of the ring 20 forcing said ring into the end of the hose and expanding such end of the hose against the inner wall of the sleeve 10 and clamping said hose end tightly against the inner wall of the sleeve as indicated at 22 in Fig. 1. Since the hose is threaded into the socket 11 it will be clear that the pressure on the ring 20 will not force the hose end from the sleeve and that the ring is forced into the hose expanding the end thereof.

From this it will be understood that the expanded end of a flexible metal hose or tubing is tightly clamped between the tapered ring 20 and the inner wall of the sleeve 10 making a fluid tight joint between the hose and the nipple 18 and also preventing unscrewing of the hose from the sleeve. During the tightening operation there is no turning movement of the sleeve 10 on or relative to the flexible metal hose to injure the latter in any way, it being understood that if the sleeve is turned in the tightening operation the hose may turn with the sleeve. However, normally when screwing home the nipple 18 to force the ring 20 into the end of the hose to expand and clamp the latter the sleeve 10 may be held stationary by a wrench while the nipple 18 is being turned to thread it into the sleeve.

Figure 3:
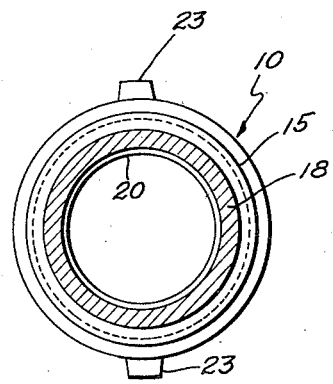
Fig. 3 is a transverse sectional view taken substantially along the line 3—3 of Fig. 1.

The present invention is not limited to the making of connections in exhaust lines since by the means of the invention a fluid tight connection may be made between a nipple or length of pipe and a spirally wound flexible metal hose to be used for any purpose. It is noted that the construction is such that the nipple 18 may be threaded into the sleeve 10 to any desired extent so as to tightly clamp the expanded end of the hose against the inner wall of the sleeve, no shoulders or other means to limit the extent of the threading of the nipple into the sleeve being present. If desired, to assist in holding the sleeve during the threading home of the nipple, the sleeve may be provided with ribs 23 as particularly shown in Fig. 3.

Having thus set forth the nature of our invention, what we claim is:

A coupling for connecting a spirally wound metal hose with a pipe comprising a sleeve having at one end an internally screw threaded socket, said socket being so threaded that one end of the hose may be screwed into it, an inwardly projecting annular shoulder at the inner end of the socket, said sleeve being internally screw threaded in its opposite end for the reception of a threaded end of a pipe, and an externally tapered ring in said socket of sufficient outside diameter to abut said shoulder and having an internal diameter less than the smaller diameter of the shoulder so as to be engaged by the end of the pipe for forcing the ring into the end of a hose in said socket by threading home of said pipe whereby the hose end is deformed against the inner surface of the socket in the sleeve.

WILFRED B. PICKARD.
JAMES C. G. MAXWELL.